United States Patent [19]

DiLoreto

[11] 4,187,582
[45] Feb. 12, 1980

[54] MEATBALL MACHINE

[76] Inventor: Lohret J. DiLoreto, 268 Parkview Ter., Oakland, Calif. 94610

[21] Appl. No.: 868,454

[22] Filed: Jan. 10, 1978

[51] Int. Cl.² .............................................. A22C 7/00
[52] U.S. Cl. .......................................... 17/32; 426/516
[58] Field of Search .................................... 17/32, 516

[56] References Cited

U.S. PATENT DOCUMENTS

| 2,442,633 | 6/1948 | Archer et al. | 17/32 |
| 2,879,593 | 3/1959 | Schwartz | 17/32 X |
| 3,002,220 | 10/1961 | Rikhoff | 17/32 |
| 3,713,187 | 1/1973 | Quartarone et al. | 17/32 |

FOREIGN PATENT DOCUMENTS 91066  2/1958  Norway ....................................... 17/32

*Primary Examiner*—Willie G. Abercrombie
*Attorney, Agent, or Firm*—Michael D. Nelson

[57] ABSTRACT

An improved machine and method for making meatballs is disclosed. The ground meat is first compressed in a compaction chamber and then extruded through an orifice located at one end of the chamber. A cutter severs a portion of the compressed meat after it is extruded through the orifice. The severed meat drops into an annular chamber formed by a semi-circular groove around the perimeter of a rotable cylindrical disc and an opposing semi-circular groove around the inner perimeter of a stationary housing surrounding the cylindrical disc. The cylindrical disc revolves causing the meat to roll within the annular chamber and form a spherical ball.

7 Claims, 8 Drawing Figures

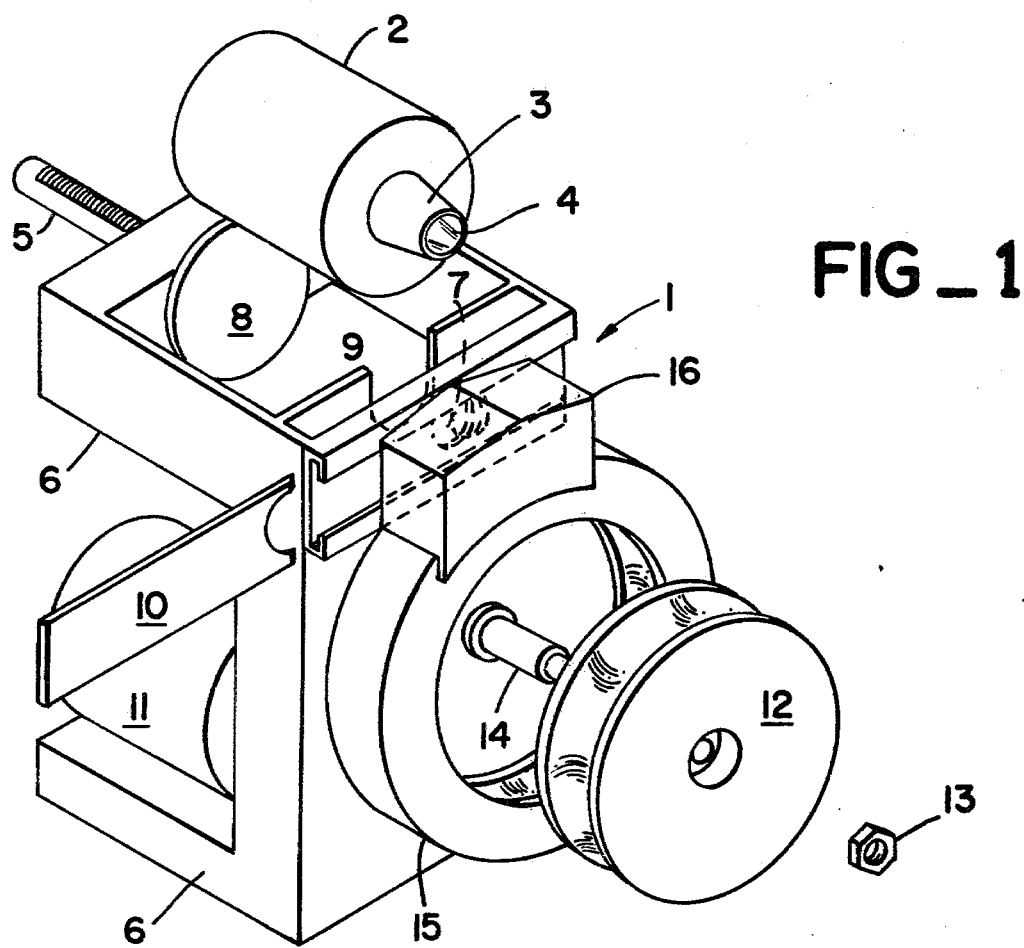
FIG_1
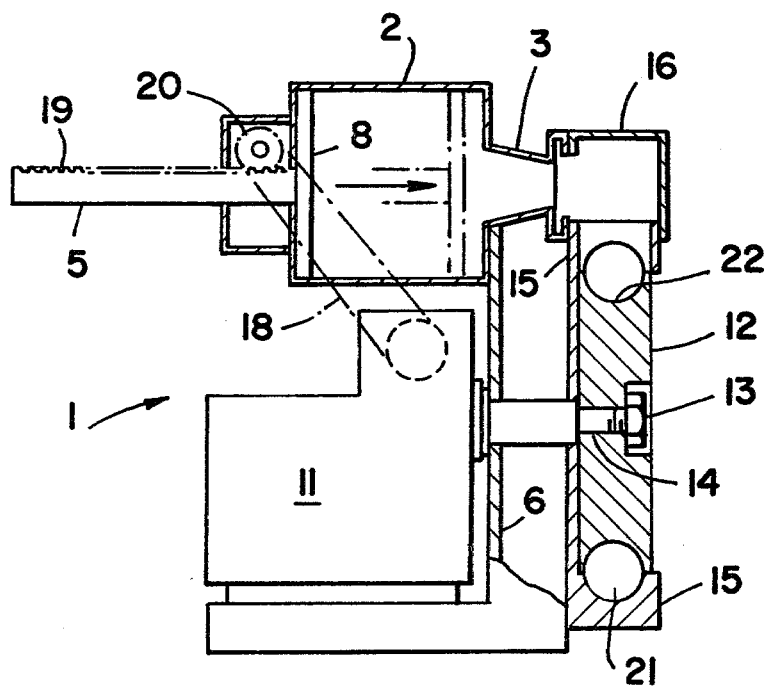
FIG_2

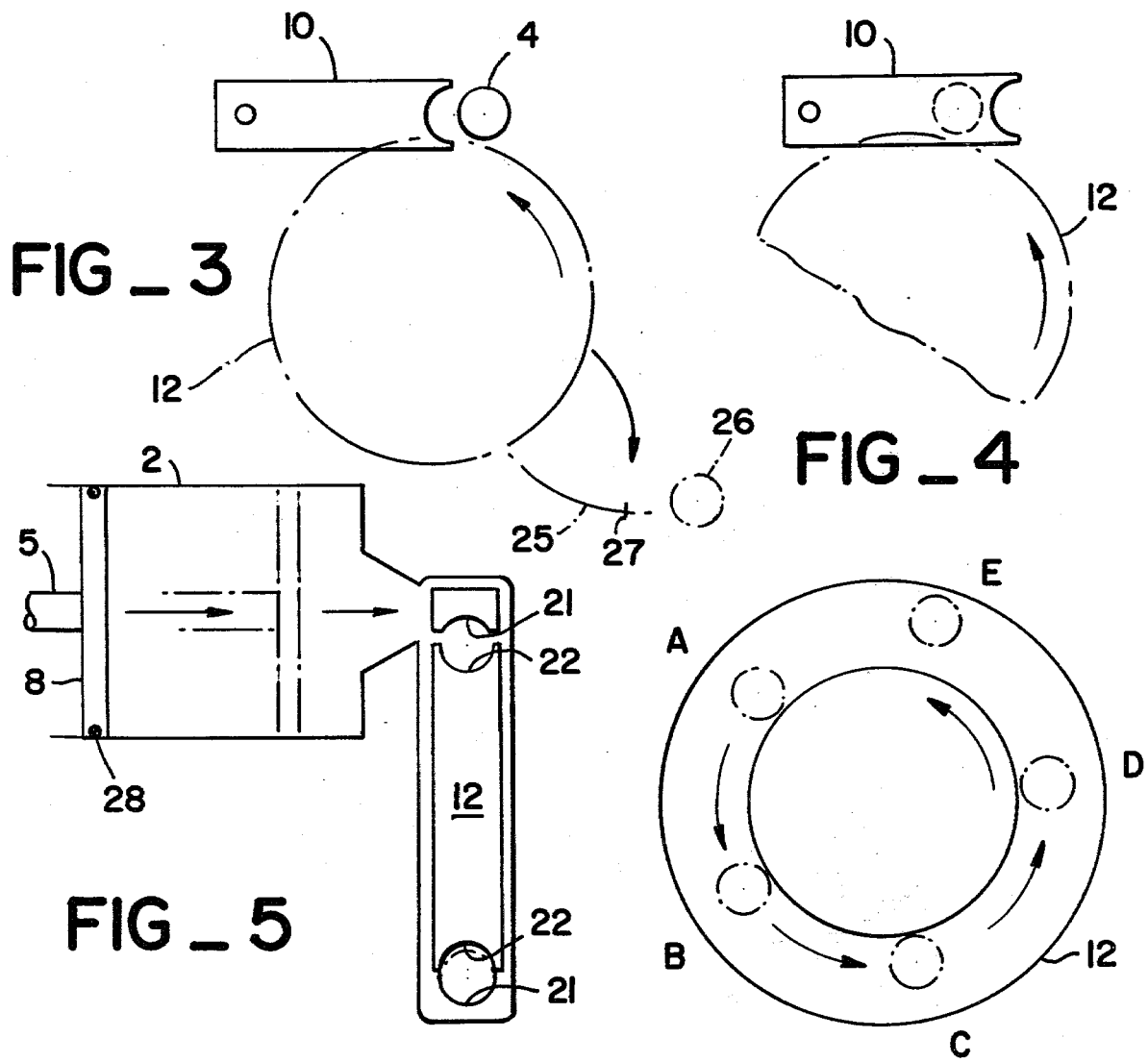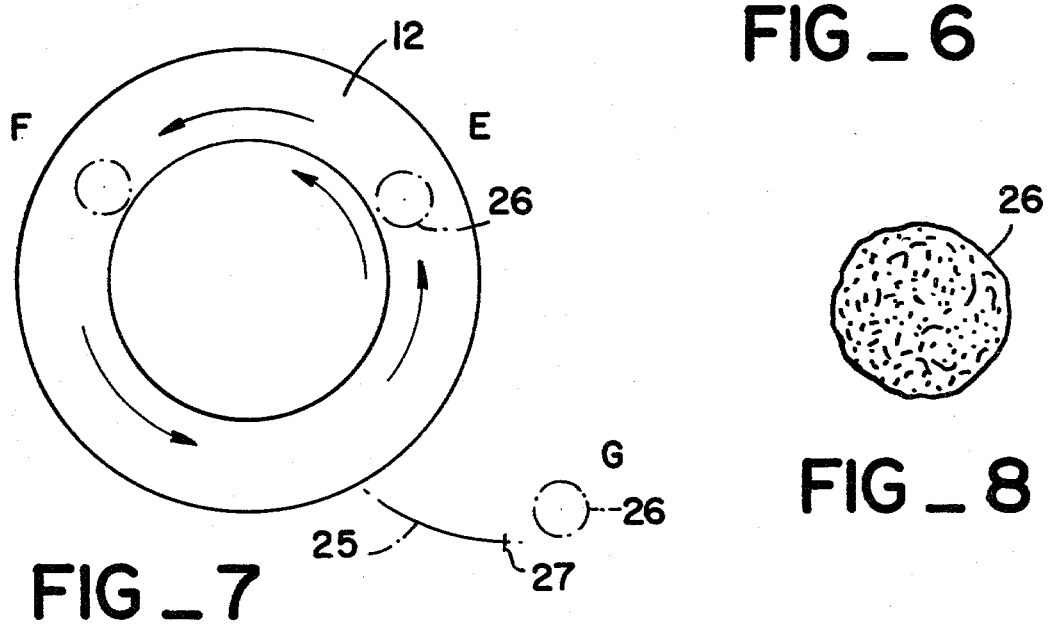

MEATBALL MACHINE

BACKGROUND OF THE INVENTION

This invention relates to an improved machine and method for manufacturing round meatballs. Meatballs are used abundantly in most restaurants serving Italian style foods. Typically these meatballs are made by hand by employees of the restaurant owner. This hand method usually involves grasping a small pre-weighed amount of ground beef between the chef's cupped hands and then squeezing and simultaneously rolling the meat into a somewhat spherical ball.

The manual method, however, has some serious problems both in the product itself and in the manner the balls are made. For example, in the manner of making the meatballs, one problem is that the chef's times is consumed in the menial task of making meatballs. Also, in restaurants having a significant volume of customers, another problem is that the chef may not be able to make a sufficient number of meatballs to serve all of the orders. Another problem with manually making meatballs is sanitation. It is easy to contaminate the meatball.

The more serious problems involve the product itself. For example, the manual method results in a product which is only as good, round, firm and capable of absorbing an adequate amount of sauce, as the chef who makes it—regardless of the ingredients. Consequently, a wide variety of meatballs are encountered. Also the same chef may make some good meatballs and upon tiring make meatballs of significantly poorer quality. The most common problem encountered are uneven or non-spherical balls. Another problem is that if the desired degree of compaction is not achieved then the meatballs may split or fall apart when placed in the sauce.

It is therefore an object of this invention to provide an improved apparatus for manufacturing meatballs;

It is a further object of this invention to provide an improved apparatus for making spherical meatballs with the proper compaction;

It is a further object of this invention, independent from the foregoing objects, to provide an improved apparatus for making meatballs quickly and without manual contact with the meatballs;

It is still another object of this invention to provide an improved apparatus for manufacturing meatballs which are properly compacted, which are spherical and which are not contacted by man during the manufacturing process;

It is another object of this invention to provide an improved method for making meatballs.

Other related and further objects of this invention will become apparent to those skilled in the art upon reviewing the specifications, claims and accompanying drawings.

SUMMARY OF THE INVENTION

The aforegoing objects and their attendant advantages may be realized by the improved apparatus of this invention. The apparatus is composed of a meat compaction section which compresses the ground meat and forces it through an orifice having a diameter from 0.4 to about 1 times the diameter of the meatball. After a desired portion of the meat is extruded through the orifice, it is severed from the remaining ground meat and the severed portion is delivered to a meat rolling section. In this section there is a stationary housing member and an internal rotable center member having a cylindrical cross-section mounted within the housing member. The internal center member revolved within the housing member. A semi-circular first groove is cut around the internal perimeter of said housing member adjacent to the center member. A second semi-circular groove is cut around the external perimeter of said center member adjacent to the housing member and positioned immediately opposite the first groove. The two grooves therefore make an elongated circular chamber or round hole in which the meatball will be rolled. The outer half of the elongated chamber, being the groove in the housing member, will be stationary. The inner half of the elongated chamber, being the groove in the center member will revolve. The revolving action of the center member and the stationary position of the housing member will cause the meatball to roll through the enlongated chamber. This action causes the meatball to become spherical. An entrance opening into the rolling chamber is provided so that the severed compressed meat may be delivered to the round hole for rolling, and an exit opening from the elongated chamber is provided so as to recover the spherical meatball.

In a particularly preferred embodiment, the apparatus is comprised of (A) a meat compaction chamber means, (B) a meat cutting means and (C) a meat rolling chamber means. The meat compaction chamber means is for compressing the ground meat. It has an orifice at one end and a compressing member which compresses the ground meat within the chamber means and forces the compressed meat through the orifice. The meat cutting means is connected to the compaction chamber means and is used for cutting off a portion of the compressed meat after the meat is extruded through the orifice. The meat rolling chamber means is connected to the compaction chamber means for receiving the severed portion of compressed meat and for rolling it into a spherical meatball. The rolling chamber means is composed of a housing member and a rotable cylindrical disc mounted within the housing member. An annular chamber is formed between the cylindrical disc and housing member by a first semi-circular groove around the outer perimeter of the cylindrical disc and a second semi-circular groove around the inner perimeter of said housing member adjacent said cylindrical disc and immediately opposite said first groove. A first opening is provided which extends through said housing member into said annular chamber so that the severed meat from the cutting means has direct access to the annular chamber. A second opening is provided which extends through said housing member into said annular chamber for removing the spherical meatball.

The apparatus and method of this invention avoids the problems associated with the manual method. The meatballs are uniformly spherical, a large number of meatballs may be manufactured within a relatively short time period, the meatballs do not fall apart when inserted into the sauce, and there is no physical handling of the meat.

DESCRIPTION OF DRAWINGS

The reference to numbered characters in the drawings refers to parts or features of one embodiment of the apparatus of the invention with the same numbered characters in the several figures referring to corresponding parts or features.

In the drawings:

FIG. 1 is an exploded perspective view of the meatball apparatus of this invention.

FIG. 2 is a cross-sectional side view of the apparatus of this invention.

FIG. 3 is a frontal view of a diagram representing the dynamics of the meat cutting and meat rolling features of the apparatus of this invention.

FIG. 4 is a frontal view of a diagram representing the dynamics of the meat cutting and meat rolling features of the apparatus of this invention.

FIG. 5 is a cross-section top view of the apparatus of this invention illustrating the dynamics of the meat compaction features of this invention.

FIG. 6 is a cross-sectional view of the rolling chamber of the apparatus of this invention with the exit means for removing the meatballs in the closed positions.

FIG. 7 is another cross-sectional view of the rolling chamber of the apparatus of this invention with the exit means for removing the meatballs in the open position.

FIG. 8 is a cross-sectional view of a representative meatball.

DETAILED DESCRIPTION OF THE INVENTION

Referring now to the drawings, one embodiment of the apparatus of this invention is illustrated. The apparatus 1 as shown in FIGS. 1 and 2 is composed of a compaction chamber 2, a cutting means 10, and a rolling means composed of stationary housing member 15, and rolling center member 12. The ground meat is placed within cylindrical chamber 2 and compressed by the forward action of piston 8. The ground meat is forced through tapered section 3 and through orifice 4. The compaction chamber is supported by piston 8 on one end and by mounting plate 9 which supports the tapered section 3 on the other end. The piston 8 is connected to driving bar 5. Driving bar 5 is supported within housing 6 and is forced forward by the action of gears 8 on the gear grooves 19 on the surface of driving bar 5. Motor 11 moves belt drive 18 which in turn causes gear 8 to revolve. This forces the piston 8 forward and compresses the ground meat.

The extruded meat passes through cutting hole 7 and a portion of the meat is severed by cutting blade 10. Cutting blade 10 slides within channel 17.

The severed protion of compressed meat falls through entrance channel 16 into the meat rolling section. The meat rolling section is composed of housing member 15 and internally mounted cylindrical disc 12. The cylindrical disc 12 is rotatably mounted on shaft 14 and held in place by nut 13. Shaft 14 is connected to motor 11 and revolves about its axis. Immediately adjacent the exterior perimeter of disc 12 is housing member 15. This housing member completely encompasses the cylindrical disc 12 and is held stationary by housing 6. A semi-circular first groove 22 is cut around the outer perimeter of disc 12 adjacent the housing member 15. A semi-circular second groove 21 is cut around the inner perimeter of housing member 15 adjacent disc 12 and immediately opposite first groove 22. The two semi-circular grooves form an annular chamber.

The severed compressed meat 26 falls through entrance channel 16 into the annular chamber. The revolving motion of the cylindrical disc 12 and the stationary position of the housing member 15 causes the meat 26 to roll within the annular chamber as it travels along the length of the chamber.

FIGS. 3 and 4 illustrate the dynamics of the revolving disc 12 and the preferred position of the entrance channel. As shown, the ground meat is extruded through orifice 4 and a portion severed. The severed meat drops downwardly into the annular chamber at a location offset from the disc axis. By offseting the entrance channel 19 from the disc axis in the manner shown, travel lenght of the meatball within the annular chamber can be maximized. The meat enters the annular chamber approximately 10 to 45 degrees from the vertical to one side of the axis. The side of the axis will depend on the direction of rotation of the disc. If the disc rotates counter-clockwise, as shown in the drawing, then the channel 19 is positioned to the right of the axis line. If the rotation is clockwise then the channel is positioned to the left.

The exit channel is illustrated in FIGS. 3 and 7 as pivotally attached flap 25 and hook 27. After the meatball has travelled through the annular path the flap 25 is opened and meatball 26 falls out. The path of the meatball is shown in FIGS. 6 and 7 as positions A, B, C, D, E, F, and G. In the preferred embodiment, flap 25 is left open and the meatball makes less than one full revolution before exiting.

FIG. 5 illustrates a top schematic type view of the compaction chamber and meat rolling section. This view illustrates the use of an O-ring 28 around the perimeter of piston 8 to provide a fluid tight seal between the piston 8 and the walls of chamber 2.

The foregoing description and the accompanying drawings only represent one embodiment of the practice of this invention. It is apparent to those skilled in the art that numerous modifications and additions to the present apparatus may be done without departing from the scope and spirit of my invention.

Compaction Means

The compaction means is illustrated in the preferred embodiment as a cylindrical chamber open at one end and having an orifice at the other end. This configuration is not critical to the practice of this invention and other shapes and cross-sections may be employed. For example, the chamber may be rectangular, square, oval conical, etc. The compaction chamber preferably should hold a sufficient amount of ground beef so as to make from 1 to 20 dozen or more meatballs. The orifice should, preferably, have a circular cross-section and have a diameter from 0.4 to 1 and more preferably from 0.5 to 0.8 times the diameter of the meatball. The compaction chamber should, preferably, subject the ground meat to a compression of 0.5 to 6 pounds per square inch and preferably from 0.9 to 3 pounds per square inch. The compaction means may be manufactured from any durable material of construction but stainless steel or aluminum are preferred.

Meat Cutting Means

The meat cutting means can be any device which severes a portion of the compressed meat from the balance of the ground meat. The type of cutter whether it be a simple sliding blade as shown in the drawings or a more complicated method such as pinching, shaking, etc., may be employed. The cutting device may be operated manually or automatically. In the latter event the blade may be connected to a device which activates when the proper amount of compressed meat has been extruded through the orifice.

Meat Rolling Means

After the meat has been properly compacted it must be shaped into a relatively spherical ball. This may be done in a wide variety of ways in accordance with the practice of this invention. The rolling step is accomplished by an elongated chamber having a split circular cross-section. One half of the circular chamber moves while the opposite half is stationary. When the meat is placed into the chamber during operation, the meat will roll through the length of the chamber. At the end of the path, the meatball will be spherical. Any chamber with this feature is considered within the scope and spirit of this invention. The annular chamber formed by the grooves in the cylindrical disc 12 and the cylindrical cavity of the housing member 15 is merely a preferred embodiment. Other constructions are possible.

For example, the revolving center member may have a conical cross-section with a semi-circular first groove cut along its outer tapering surface in a helical path. The housing member will have an opposing conical cavity and a semi-circular second groove cut along the internal tapering surface in a helical path and immediately opposite the first groove. In this embodiment the circular rolling chamber will have a helical path starting at one end of the cone and traversing the cone surface to the other end. In this embodiment there is no need for a flap 25 since the meat may enter at one end of the helix and exit the other.

Other examples include rotating the housing member and holding the center member stationary, or rotating both members in opposite directions or at different speeds.

The center member will usually be rotated at about 1 to 60 revolutions per minute and preferably at about 10 to 40 revolutions per minute. The rotation speed will normally vary depending upon the size of the machine being constructed.

The entrance channel and the exit channel will typically have a larger diameter than the annular chamber so as to facilitate easy loading and unloading of the meatballs.

I claim:

1. An apparatus for making meatballs which comprises:
   (a) a meat compaction means for compressing ground meat used in making meatballs under a pressure of 0.5 to 6 psi and forcing the compressed meat through an orifice positioned at one end of said compaction means, said orifice having a diameter from about 0.4 to 1 times the diameter of the meatball,
   (b) a meat rolling means connected to said meat compaction means for receiving the compressed meat from said orifice and rolling the compressed meat into a spherical meatball; said meat rolling means having (1) a stationary housing member (2) an internally mounted center member having a circular cross-section, said center member being rotatable about its axis, (3) semi-circular first groove around the internal perimeter of said housing member adjacent said member, (4) a semi-circular second groove around the external perimeter of said center member adjacent said housing member and positioned immediately opposite said first groove to form an elongated circular chamber between said housing member and said center member, (5) an entrance channel through said housing member communicating with said elongated circular chamber, and (6) an exit channel through said housing member communicating with said elongated circular chamber;
   whereby the ground meat is compressed in said meat compaction means, extruded through said orifice, falls through said entrance channel into said elongated circular chamber of the meat rolling means, rolled between the stationary housing member and the rotating center member into a spherical meatball and recovered through said exit channel.

2. The apparatus defined in claim 1 wherein said meat compaction means has a cylindrical cross-section and is open at the opposite end from said orifice.

3. The apparatus defined in claim 1 wherein said ground meat is compressed under a pressure of 0.9 to 3 pounds per square inch.

4. The apparatus defined in claim 1 wherein said center member is a cylindrical disc and revolves around its axis at a rotation speed of 1 to 60 revolutions per minute.

5. An apparatus for making meatballs which comprises:
   (a) a meat compaction chamber means for compressing ground meat, said chamber means having an orifice at one end and a compression member which compresses the meat within the chamber means and forces the compressed meat through said orifice;
   (b) a meat cutting means connected to said compaction chamber means for cutting off a portion of said compressed meat after said meat is extruded through said orifice;
   (c) a meat rolling chamber means connected to said compaction chamber means for receiving said severed portion of said compressed meat and rolling said meat into a spherical meatball; said rolling chamber means having (1) a housing member (2) a rotatable cylindrical disc mounted within said housing member, (3) an enclosed annular chamber between said housing member and said cylindrical disc, (4) a first opening through the upper portion of said housing member extending into said annular chamber for receiving said severed meat and (5) a second opening within the lower portion of said housing member extending into said annular chamber for removing said spherical meatball from said annular chamber; said annular chamber being formed from a first semi-circular groove around the outer perimeter of said cylindrical disc and a second semi-circular groove around the inner perimeter of said housing member adjacent said cylindrical disc and opposite said first groove.

6. The apparatus defined in claim 5 wherein said first opening is positioned on one side of the axis line of said cylindrical disc.

7. The apparatus defined in claim 5 wherein a pivotal flap is provided across said second opening to prevent the withdrawal of said meatball when in the closed position and permitting removal of the meatball when in the open position.

* * * * *